UNITED STATES PATENT OFFICE.

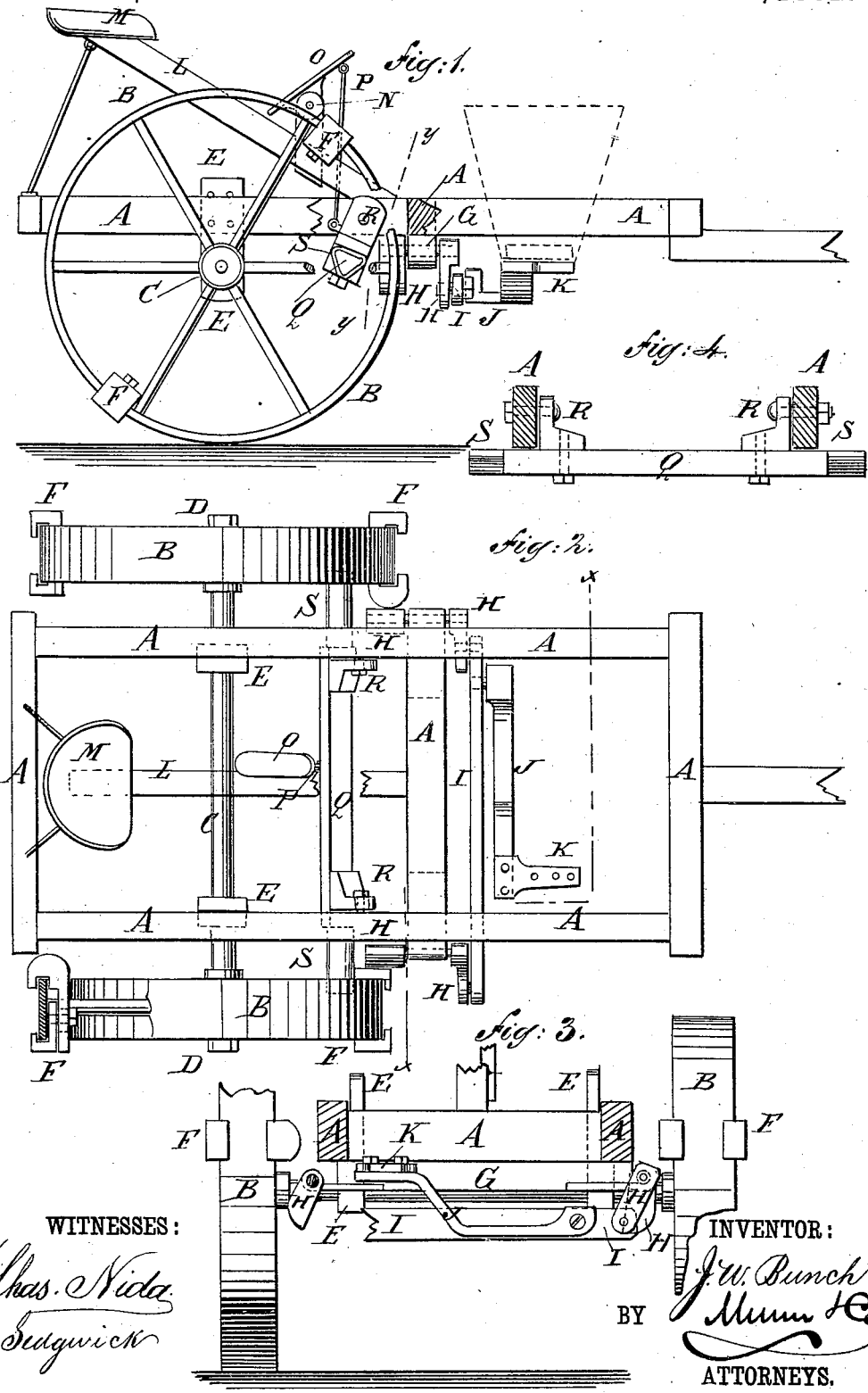

JOHN W. BUNCH, OF COMMERCIAL POINT, OHIO.

SEED-PLANTER.

SPECIFICATION forming part of Letters Patent No. 254,607, dated March 7, 1882.

Application filed October 24, 1881. (No model.)

*To all whom it may concern:*

Be it known that I, JOHN W. BUNCH, of Commercial Point, in the county of Pickaway and State of Ohio, have invented a new and useful Improvement in Seed-Planters, of which the following is a full, clear, and exact specification.

Reference is to be had to the accompanying drawings, forming part of this specification, in which similar letters of reference indicate corresponding parts in all the figures.

Figure 1 is a side elevation of my improvement shown as applied to the frame of a planter, parts being broken away. Fig. 2 is a plan view of the same. Fig. 3 is a sectional end elevation of the same, taken through the broken line $xx$, Fig. 2. Fig. 4 is a sectional elevation of a part of the same, taken through the line $yy$, Fig. 1.

The object of this invention is to provide a simple and effective mechanism for operating the seed-dropping slide of a planter from the transporting-wheels, and also to hold the wheels from revolving when turning and when adjusting the machine to bring the cross-rows in line.

A represents the frame of an ordinary seed-planter. B are the transporting-wheels, which are secured to the journals of the axle C by nuts D, so that by screwing up the said nuts D the wheels can be made to carry the said axle C with them in their revolution. The axle C revolves in bearings in blocks E, secured to the side bars of the frame A by bolts, and which have several holes formed through them to receive the fastening-bolts, so that they can be attached to a higher or lower frame A, as may be required.

To the rim of each wheel B are attached two clamps, F, directly opposite each other, as shown in Fig. 1, and which are designed to mark the hills and to operate the seed-dropping mechanism. The blocks F are made in two parts, the shanks of which overlap each other, and are secured to each other and to the rim of the wheel by set-screws, as shown in Fig. 2. The blocks F are designed to be placed upon the rims of the wheels just in front of spokes, so that they cannot be pushed back upon the said rims by pressure against the ground. The inner end of one of the blocks F of each wheel is rounded, as shown in Fig. 2, and the said blocks are secured to the wheels in such positions that when the block with a rounded end of one wheel is in contact with the ground the corresponding block of the other wheel will be at the top of the said wheel.

To the lower side of a cross-bar of the frame A is secured a bar, G, in bearings attached to the ends of which, or to the said frame A, work the cranks H. The rear arms of the cranks H are in such positions that they will be struck successively by the rounded ends of the blocks F.

To the forward arms of the cranks H are pivoted the ends of a connecting-bar, I, to which, near one end, is pivoted the end of a pitman, J. The bar J is bent to bring the arm K, formed upon or attached to its other end, into position to be bolted to the seed-dropping slide of the planter. Several holes are formed in the arm K to receive the fastening-bolt, so that the improvement can be applied to planters that are coupled longer or shorter, as may be required. With this construction the cranks H will be struck successively by the rounded ends of the blocks F, so that the connecting-bars will be moved to operate the seed-dropping slide and drop the seed at each half-revolution of the wheels B, making the distance between the hills equal to half the circumference of the said wheels B.

To the inclined bar L that supports the driver's seat M, or to some other suitable support, is attached a short standard, N, to the upper end of which is fulcrumed the foot-lever O. To the forward end of the foot-lever O is attached the upper end of a rod, P, the lower end of which is attached to a cross-bar, Q. The cross-bar Q is attached to the lower ends of arms R, the upper ends of which are hinged to the side bars of the frame A. The ends of the cross-bar Q project, so as to be within the circles of the rims of the wheels B, and have brake-shoes S formed upon or attached to them. With this construction the driver, by operating the lever O with his foot, can swing the cross-bar Q forward to bring the brake-shoes S in contact with the rims of the wheels B and hold the said wheels B from revolving and wasting seed when turning around at the ends of the rows, and also to hold the said wheels from revolving when adjusting the machine at the ends of the rows and at other places when necessary to cause the hills to be dropped in line with the cross-rows, and thus plant the field in check-row.

Having thus described my invention, I claim as new and desire to secure by Letters Patent—

1. In a seed-planter, the combination, with the wheels B, of the blocks F, made in two parts, secured to each other and to the wheel-rim by set-screws, substantially as herein shown and described, whereby the hills will be marked and the seed-dropping mechanism operated, as set forth.

2. In a seed-planter, the combination, with the wheels B and the frame A, of the two-part blocks F, the cranks H, having cams H', the reciprocating bar I, and the pitman J, having arm K, substantially as herein shown and described, whereby the revolution of the transporting-wheels will vibrate the said connecting-bar to operate the seed-dropping slide, as set forth.

JOHN WESLEY BUNCH.

Witnesses:
JAMES VAUGHN,
WILLIAM ABBOT.